US010641934B2

(12) United States Patent
Schneider et al.

(10) Patent No.: US 10,641,934 B2
(45) Date of Patent: May 5, 2020

(54) METHODS AND SYSTEMS FOR DISTINGUISHING POINT SOURCES

(71) Applicant: Rambus Inc., Sunnyvale, CA (US)

(72) Inventors: Alexander C. Schneider, Los Altos, CA (US); Patrick R. Gill, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 243 days.

(21) Appl. No.: 15/922,026

(22) Filed: Mar. 15, 2018

(65) Prior Publication Data
US 2018/0275323 A1    Sep. 27, 2018

Related U.S. Application Data

(60) Provisional application No. 62/539,685, filed on Aug. 1, 2017, provisional application No. 62/476,107, filed on Mar. 24, 2017.

(51) Int. Cl.
G02B 5/18 (2006.01)
G02F 1/01 (2006.01)
H04N 5/345 (2011.01)
G06T 7/11 (2017.01)

(52) U.S. Cl.
CPC ............ G02B 5/1842 (2013.01); G02F 1/01 (2013.01); G06T 7/11 (2017.01); H04N 5/345 (2013.01); G06T 2207/20164 (2013.01)

(58) Field of Classification Search
CPC ........... G02B 5/1842; G06T 7/11; G02F 1/01; H04N 5/345
See application file for complete search history.

(56) References Cited

U.S. PATENT DOCUMENTS

| 4,531,195 A * | 7/1985 | Lee ................... G01S 13/587 342/189 |
| 5,387,973 A * | 2/1995 | Sillitto ................ G01J 1/4257 356/457 |
| 9,100,514 B2 * | 8/2015 | Gu ....................... H04N 5/2329 |
| 2009/0316558 A1 * | 12/2009 | Hashimoto .......... G11B 7/0065 369/103 |
| 2012/0273676 A1 * | 11/2012 | Kuijper .................. G06T 5/003 250/307 |
| 2013/0021474 A1 | 1/2013 | Taylor et al. |
| 2013/0187028 A1 * | 7/2013 | Salvestrini ............. H04N 5/378 250/208.1 |

(Continued)

OTHER PUBLICATIONS

Chow, Chi-Wai et al., "Visible Light Communication Using Mobile-Phone Camera With Data Rate Higher Than Frame Rate", Optical Society of America, Optics Express, vol. 23, No. 20, Oct. 5, 2015. 6 Pages.

(Continued)

Primary Examiner — David F Dunphy
(74) Attorney, Agent, or Firm — Silicon Edge Law Group LLP; Arthur J. Behiel

(57) ABSTRACT

An optical smart sensor combines a phase grating with a rolling shutting to distinguish between modulated point sources. Employing a phase grating in lieu of a lens dramatically reduces size and cost, while using timing information inherent to imaging techniques that used a rolling shutter allows the smart sensor to distinguish point sources quickly and easily using a single frame of image data.

22 Claims, 5 Drawing Sheets

(56) References Cited

U.S. PATENT DOCUMENTS

2013/0201560 A1* 8/2013 Dueck .................. H01S 3/0071
359/569
2015/0139385 A1* 5/2015 Bone ................ G01N 23/20075
378/36

OTHER PUBLICATIONS

Ji, Peng et al., "Vehicular Visible Light Communications With LED Taillight and Rolling Shutter Camera", IEEE, 2014. 6 Pages.
Motion Capture, Downloaded from https://en.wikipedia.org/wiki/Motion_capture#Optical_systems on Jul. 12, 2017. Last edited on Jun. 23, 2017, at 10:55. 11 pages.
Snoeyink, Craig et al., "Three-Dimensional Locating of Paraxial Point Source With Axicon", Optics Letters, vol. 37, No. 11, 2012 Optical Society of America, Jun. 1, 2012. 4 pages.
Zhou, Wei et al., "Estimation of Illuminant Direction and Intensity of Multiple Light Sources", Image Modeling and Synthesis (VIMS) Lab, University of Delaware, Newark DE, WWW home page: http://www.cis.udel.edu/~wzhou/research/research.html http://www.cis.udel.edu/~vims, ECCV '02 Proceedings of the 7th European Conference on Computer Vision—Part IV, May 28-31, 2002, Springer-Verlag London, UK 2002. pp. 206-220. 15 pages.

* cited by examiner

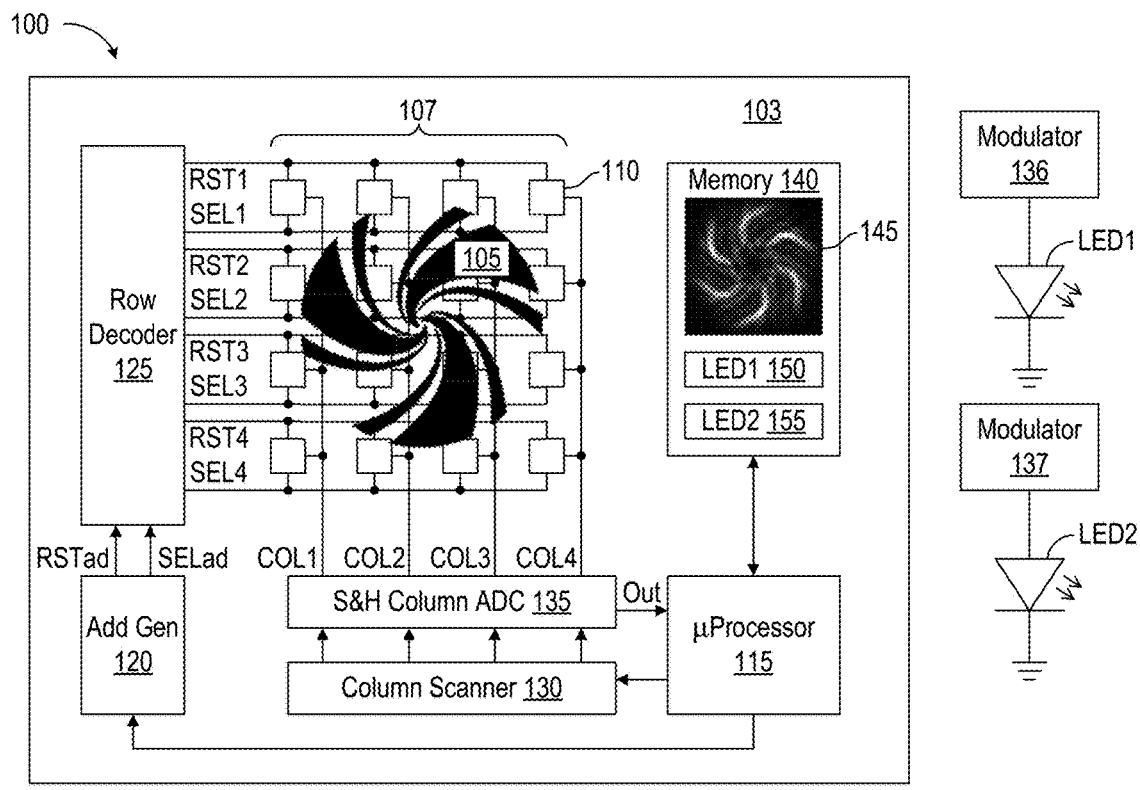
FIG. 1A
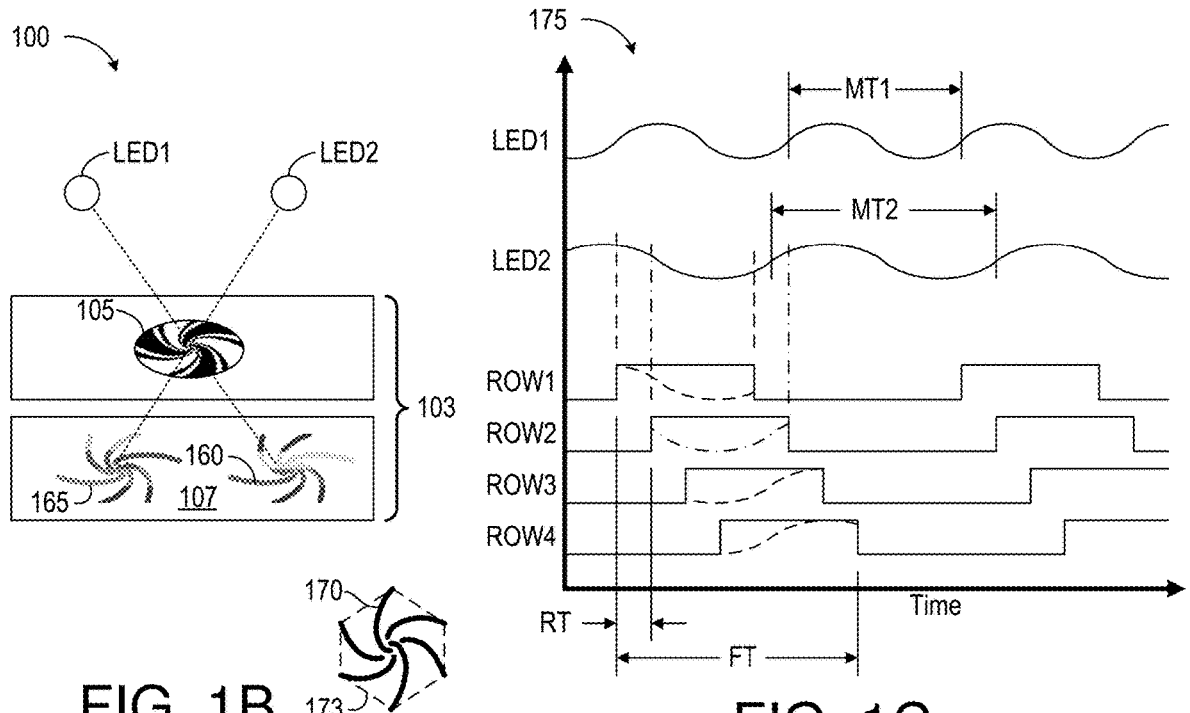
FIG. 1B
FIG. 1C

METHODS AND SYSTEMS FOR DISTINGUISHING POINT SOURCES

BACKGROUND

Many applications for computer vision involve locating, tracking, and distinguishing between point sources. Established tracking solutions often use custom passive or active markers. For example, a virtual-reality controller glove can present multiple markers to reveal its orientation to an image sensor. If one of the markers becomes occluded, it is useful to know which one. Sources can be flashed in different patterns and monitored frame-to-frame for identification, and potentially many frames may be required after rapid movement for confident disambiguation. Imaging systems that do this well can be bulky and expensive.

BRIEF DESCRIPTION OF THE DRAWINGS

The detailed description is illustrated by way of example, and not by way of limitation, in the figures of the accompanying drawings and in which like reference numerals refer to similar elements and in which:

FIG. 1A depicts an optical system 100 with an optical smart sensor 103 that combines a phase grating with a rolling shutter to distinguish between modulated point sources.

FIG. 1B is a simplified view of system 100 illustrating how the varying intensities of illumination sources LED1 and LED2 interact with the rolling shutter to produce distinct PSFs 160 and 165 on an array 107.

FIG. 1C is a waveform diagram 175 illustrating operational timing of optical system 100 of FIGS. 1A and 1B.

FIG. 4A is a cut-away view of an imaging image sensor 100 of FIG. 1A, like-identified elements being the same or similar.

DETAILED DESCRIPTION

Figure 2:
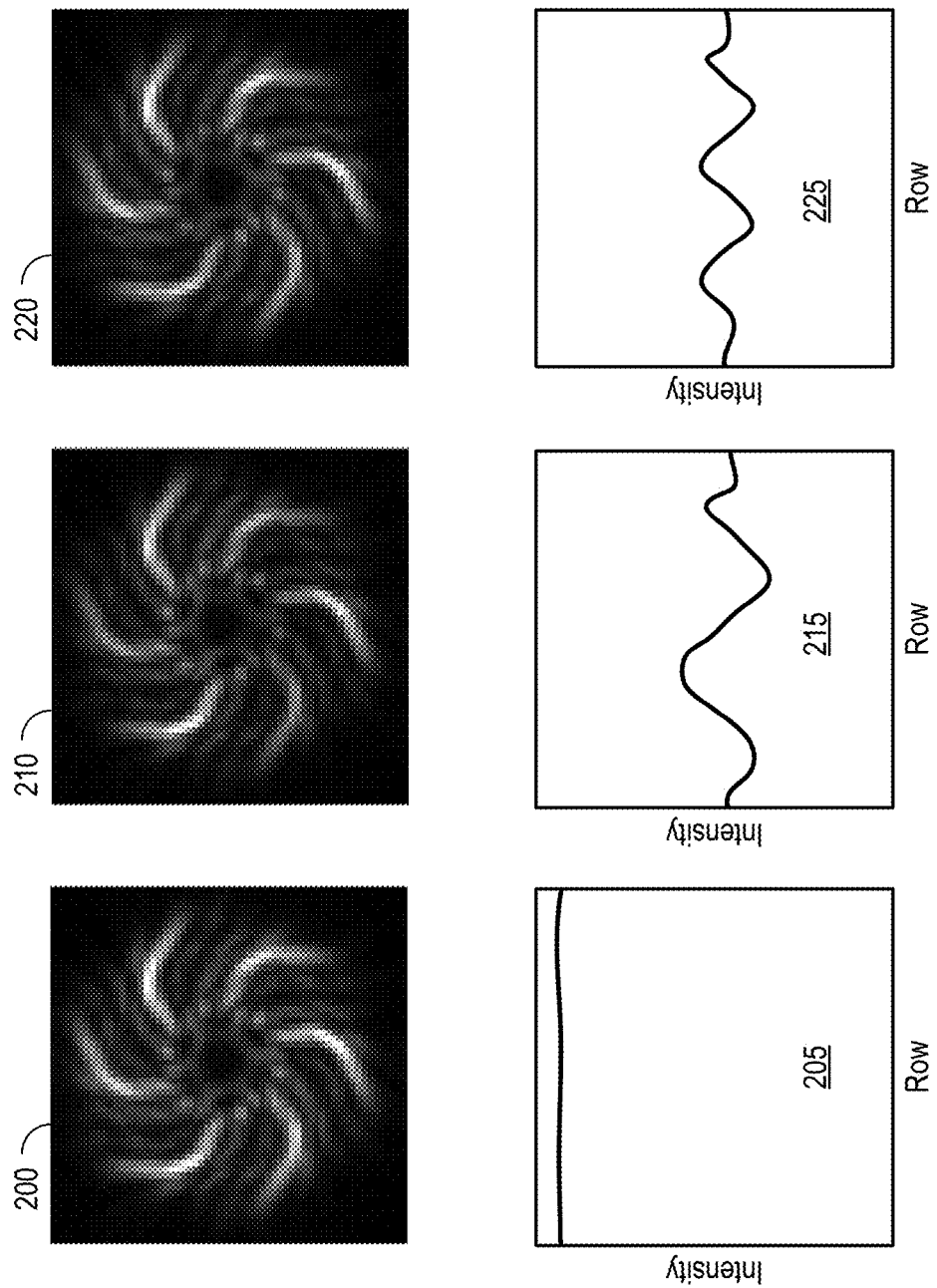
FIG. 2 depicts image data from an optical system in which a 20 mW, 850 nm LED illuminates an image sensor with a 1 mm aperture at a range of 1 m.

FIG. 1A depicts an optical system 100 with an optical smart sensor 103 that combines a dispersive optic, such as a phase grating, with a rolling shutter to distinguish between modulated point sources, a pair of light-emitting diodes LED1 and LED2 in this example. Employing a phase grating in lieu of a lens dramatically can reduce size and cost, while using timing information inherent to a rolling shutter allows system 100 to distinguish point sources quickly and easily and, in some embodiments, can enable such distinguishing using only a single frame of image data. As used herein, the term "frame" refers to a single electronically coded image, and is not limited to video technology.

Smart optical sensor 103 includes a phase grating 105 that exhibits a nearly invertible point-spread function (PSF) to produce a diffractive response to point sources LED1 and LED2 on an underlying array 107 of pixels 110. Array 107 can be part of a CMOS image sensor with rows and columns of pixels 110 under control of a microprocessor 115 via an address generator 120 and a row decoder 125. Microprocessor 115 reads from successive rows of pixels 110, from top to bottom and left to right, using a column scanner 130 and a sample-and-hold analog-to-digital converter (ADC) 135. Array 107 includes only sixteen pixels 110 for ease of illustration, though inexpensive arrays for sensing visible light commonly include a million or more.

Address generator 120 is a shift register that sequentially scans all of the rows and generates row-reset (RST1-RST4) and row-select (SEL1-SEL4) signals for row address decoder 125. Row decoder 125 applies these signals to control the exposure for each row of pixels. In particular, each row of pixels becomes photosensitive upon receiving a row-reset signal RST # and stops collecting photons upon receiving a row-select signal SEL #. ADC 135 reads out each row of sample values thus collected one column at a time, from left to right. There is but one column line COL # per column so readout timings are different for each row, with each successive row delayed from the last by a row time RT. The rows are thus exposed at slightly different times. In this example, the lower a row in a captured frame the later the observation of the imaged scene. This approach is commonly referred to as "rolling shutter."

Sensors that employ rolling-shutter timing can produce objectionable image artifacts in still or video frames. For example, sampling different portions of a moving object over time produces non-rigid deformations that can be very distracting, and light sources that vary in intensity over the timing of a frame can show as horizontal bright and dark bands on the captured image. System 100 takes advantage of this latter form of distortion and attributes of the PSF of grating 105 to distinguish between illumination sources.

Modulators 136 and 137 modulate power to respective illumination sources LED1 and LED2 so that the output intensities of LED1 and LED2 vary sinusoidally over respective modulation periods MT1 and MT2. The modulated intensity combines with the offset row timings of the rolling shutter to superimpose relatively dark and bright horizontal bands on sampled point-spread responses of the captured image. The observed banding is a function of the modulation period of the sampled light, and thus can be used to distinguish between point-spread responses (PSRs), and thus between the modulated illumination sources.

In the embodiment of FIG. 1, a memory 140 within optical smart sensor 103 stores a kernel 145 that represents the PSF of grating 105, possibly in combination with the underlying array 107, and modulation signatures 150 and 155 that characterize the modulations applied by modulators 136 and 137, and thus distinguish illumination sources LED1 and LED2. Processor 115 can use kernel 145 locate PSRs in a captured frame or frames and extract intensity information from the PSRs that can be demodulated and matched against modulation signatures 150 and 155 to identify the corresponding point sources. Other point sources in the scene, potentially with different modulations and therefore conveying different information, may be present and independently demodulated without cross interference. Modulation signatures 150 and 155 may simply reflect respective modulation frequencies, though more complex modulation schemes may be used.

FIG. 1B is a simplified view of system 100 illustrating how the varying intensities of illumination sources LED1 and LED2 interact with the rolling shutter to produce distinct PSRs 160 and 165 on array 107. Optical smart sensor 103 can calculate the angular positions of point sources by noting the locations of their PSRs on array 107, and can distinguish between modulated point sources by considering the striping of each PSF. Optical smart sensor 103 can thus determine the positions of multiple point sources using a single frame of image data. An unmodulated point-spread response (PSR) 170 is depicted at the bottom of FIG. 1B for comparison. As compared with a lens, the PSR of which is a spot, PSR 170 of grating 105 is spread out over more rows of pixels 110. In one embodiment, for example the diameter of PSR 170 extends vertically across about sixty rows of pixels. Grating 105 produces a multi-armed spiral PSF in this embodiment, though other shapes can be used.

PSR 170 represents a sharply focused diffractive response from an exemplary imaged point source as it may appear at array 107. PSR 170 is illustrated as dark on a light background for ease of illustration, but would appear as a relatively bright pattern on a darker background. PSR 170 illuminates a set of R pixels within a convex hull 173, the smallest convex set of S pixels that encompasses all the illuminated pixels. (Convex hull 173 may be visualized as the shape formed by a rubber band stretched around PSR 170.) To find the convex hull for a given imaging device, PSR 170 can be sampled by array 107. With the brightest pixel(s) serving as a reference, those pixels with at least 10% of that maximum brightness are included in the set of R pixel values representative of the response. Convex hull 173 is the smallest convex set of pixels 110 that includes that set of R pixel values. In this example, PSR 170 illuminates a pattern such that the set of illuminated pixels R is less than half of the convex set S (S>2R). The convex hull is not used for image acquisition or analysis, but affords a measure of response area that can be used to characterize the ratio of active pixels relative to a PSR and the richness of spatial modulations spread out over an area greater than typical of focused or defocused conventional optics. The set of spatial modulations within hull 173 allow processor 115 to precisely locate the center of PSR 170, increase motion sensitivity, and extend over many rows of pixels to support point-source discrimination in the manner detailed herein.

FIG. 1C is a waveform diagram 175 illustrating operational timing of optical system 100 of FIGS. 1A and 1B. A waveform for each row shows the exposure timing, which is to say the duration that each row is exposed to light from an imaged scene. Sampled intensity data is transferred out and pixels in each row are reset between exposures. These operations are well known so the details are omitted.

Considering illumination source LED2, the exposure times for successive rows are offset by row time RT so that the pixels 110 in each row integrate the modulated intensity over different ranges of intensity. The resultant impact on row intensities produces the striping of the PSR 165 associated with LED2. The modulation period MT1 of LED1 likewise produces a striping in PSR 160. However, the spacings between the stripes in PSRs 160 and 165 are a function of their respective modulation periods MT1 and MT2, and can thus be used to distinguish between illumination sources LED1 and LED2. Both modulation periods MT1 and MT2 are greater than row time RT (the timing delay between successive row exposures) and less than a frame time FT (the cumulative time of all row exposures for a single image frame).

FIG. 2 depicts image data from an optical system in which a 20 mW, 850 nm LED illuminates an image sensor with a 1 mm aperture at a range of 1 m. Light was collected using a four-megapixel (1688×1520 pixels) CMOS image sensor at thirty frames per second. At left is a 60×60 pixel sub-image cropped from full-resolution image data and centered on a PSR 200 for an unmodulated illumination source. An accompanying intensity graph 205 shows the accumulated intensity value of each of the sixty rows normalized for the PSF of grating 107 as a function of pixel row. The line at the top of graph 205 shows that each row is essentially as bright as it should be to describe the corresponding optical slice of unmodulated PSR 200. The flat response identifies the source as unmodulated.

With reference to FIG. 1A, imaging device 103 is programmed to locate PSR 200 amidst a four-megapixel frame, extract the row-intensity data depicted in graph 205, and extract modulation information from the row-intensity data. To locate each PSR in a given frame of a sampled interference pattern, processor 115 correlating the sampled interference pattern with kernel 145. Peak responses produced by this correlation represent matches between PSRs and the calibrated PSF represented by kernel 145. Ideally, one could reconstruct an image of the captured scene by inverting the effect of the PSF of grating 105 on the interference pattern using linear algebra. In practice, however, the PSF is not well conditioned and the interference pattern is noisy. Applying a regularized pseudoinverse to the interference pattern is thus more practical. One popular pseudoinverse is given by Tikhonov regularization, which is well known to those of skill in the art. This reconstruction process can be accomplished using low-resolution image data to save time and power.

The image reconstructed from the sampled interference pattern exhibits a bright spot for each PSR, each spot indicative of the center of the corresponding PSR. Processor 115 crops the captured interference pattern using a window centered on each PSR location and sized to just encompass the PSR, PSR 200 cropped within a 60×60 pixel window in the instant example. Processor 115 then extracts row-intensity data from the cropped PSR. In one embodiment processor 115 accumulates each row of intensities in each cropped PSR using a function Demodulate( ) that takes a cropped 60×60 sub-image Crop (e.g., PSR 200) and the PSF of grating 105, represented by kernel 145, and returns a one-dimensional signal in which each element is an estimate of the average intensity of the point light source during the integration interval of the corresponding row of the input image, given the same row of the PSF of grating 105. The result for PSR 200 is the row-intensity data depicted in graph 205.

Assuming a function SumRows( ), which takes as input an N×M image and returns an M-element signal whose each value is the sum of the N pixels on the corresponding row, function Demodulate( ) can be expressed mathematically as SumRows(Crop*PSF)/(gamma+SumRows(PSF*PSF)). As gamma goes to zero, the function Demodulate( ) tends toward taking the cropped interference pattern Crop and dividing by the PSF of grating 105. Since there are rows where the PSF is not as strong as in other rows, and at the top and bottom of the cropped capture PSF it does actually taper to zero, we do not simply divide by zero so as to avoid applying a large gain to row sum values that are largely due to noise. Gamma in this case ensures that as the PSF tapers to zero, so does the demodulation output. In rows where the PSF is strong, function Demodulate( ) does something very close to dividing by the appropriate component of the PSF and thus provides a flat, unbiased estimate of the corresponding source intensity with the effect of the PSF canceled out.

At center of FIG. 2 is a PSR 210 for the same point source used to generate unmodulated PSR 200 but modulated 100% (dark to bright) at 1.5 kHz. PSR 210 is clearly identifiable as a point-source response and can be used to locate the corresponding point source. The accompanying intensity graph 215, showing the intensity normalized for the grating PSF as a function of pixel row, reflects the modulation period over the range of rows. On the right, a PSR 220 for the same point source used to generate PSFs 200 and 210 modulated 100% at 2.5 kHz appears much like the other PSFs but is easily distinguished by the accompanying intensity graph 225. Other point sources in the scene, potentially with different modulations (and therefore conveying different information) may be present and independently demodulated without cross interference. Processor 115 demodulates the collections of intensity values represented by graphs 205, 215, and 225 to extract modulation characteristics unique to each point source. In this way, optical system 100 can distinguish between the point sources responsible for PSRs 200, 210, and 220.

The ability to distinguish point sources confers a degree of "jam resistance," where a receiver is able to perform demodulation on only the pixels that are expected to be influenced by a desired point source. Even an extremely bright (bright enough to cause saturation of the pixels that see it) light source displaced from the point source of interest can be ignored.

One simple application for this concept is in 3D position and pose estimation for virtual-reality (VR) applications. A VR helmet may have an array of point sources on it, observed by a camera fixed to a base station. If the point sources are modulated differently (e.g., simple sinusoids repeating unconditionally) they can be distinguished in a single frame. An unambiguous orientation can be derived for the helmet without any potentially unreliable disambiguation algorithm that may require extensive temporal history. Frames can be combined in other embodiments, such as to extend the discernable modulation periods.

In a VR headset, the LEDs of different parts of the wearable gear (including headsets, gloves, etc., of many users) each could be distinguished on a per-frame basis. Other game controllers such as "magic wands" similarly could link an object's digital identity with its location in space given only the ability to modulate luminosity (or even merely reflectivity).

In an Internet-of-Things (IoT) application, an array of sensors may require very-low-power, one-way communication to a mains-powered base station. Each sensor may run on harvested energy and only infrequently illuminate a modulated LED to transmit a sensor reading back to base. This may include smart building applications where employees or customers wear low-power tags that periodically broadcast a unique ID and/or very-low-bandwidth sensor data. In a smart warehouse, a shipping container may report internal temperature measurements, etc. A gaming application may give each player a simple, inexpensive controller with only a single IR LED. One or more smart optical sensors viewing the playing area would be able to locate and receive control inputs from each player (e.g., laser-tag participant). There may also be applications that overlap with current near-field-communication use cases, for example transmitting a personal identification number for secure and convenient pairing between devices.

In the IoT sensor example, a variety of modulation schemes may be applicable, including pulse position modulation, orthogonal frequency division multiplexing, etc. In some embodiments, only amplitude is straightforward to demodulate as the phase of modulation in the image will vary arbitrarily. Some embodiments include an intra-period synchronization mechanism to make phase available for modulation. The modulation task is made easier if the capture parameters of the sensor are known. If the transmitter and receiver are not co-designed, the receiver may be able to change its frame rate, exposure etc. adaptively to optimize reception from the transmitter.

With a fixed exposure time, certain modulation frequencies will not be transmitted through to a rolling-shutter image. If the modulation frequency is an integer multiple of the reciprocal of the exposure time, the modulation can be canceled and not be reflected in the image. Capturing frames at two different exposures will make those frequencies observable, potentially allowing the two frames to be combined to derive a single spectrum with no zeroes and more available bandwidth. Some rolling-shutter image sensors provide a mechanism to automatically switch between two or more exposures on consecutive frames, which may be useful in this approach.

In addition to the integer-multiple issue, longer exposure times suffer from a 1/f amplitude response, limiting the amount of information that can be encoded in one frame. In the case that the source is dim enough to demand a longer integration, and if amplitude-only modulation is performed at the source, the PSR demodulation outputs from multiple short-exposure frames may be accumulated, improving the signal-to-noise ratio (SNR) and allowing more information to be decoded reliably.

Figure 3A:
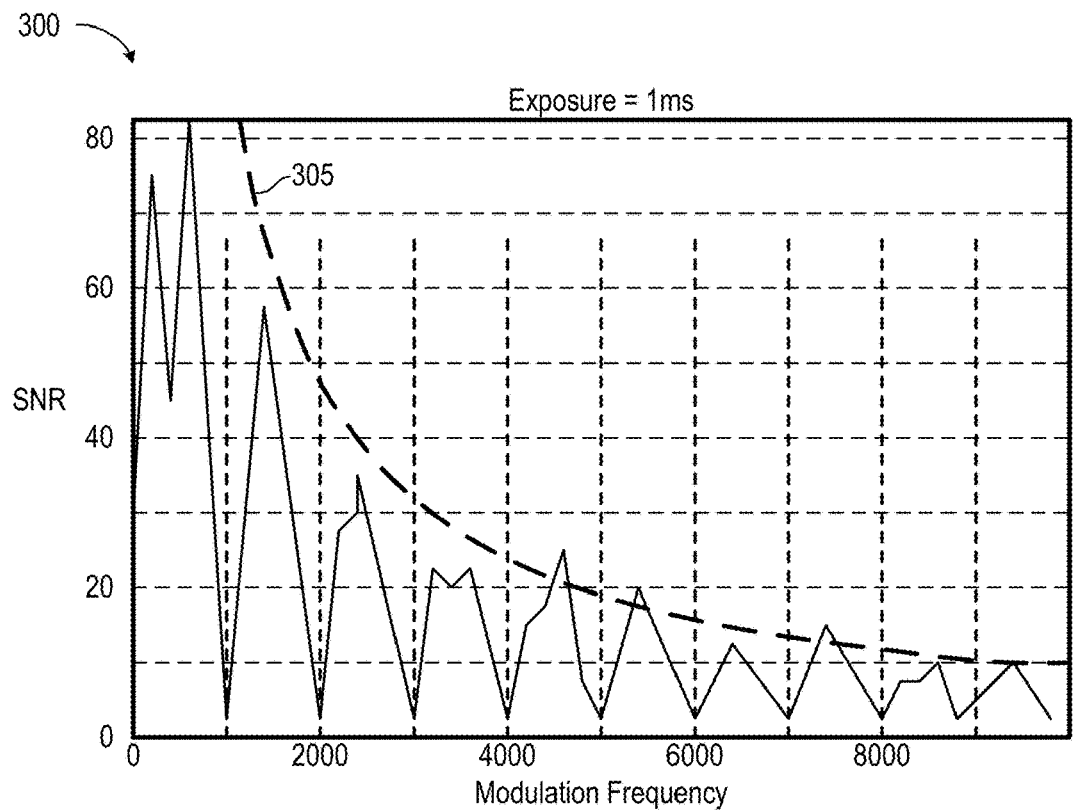
FIG. 3A is a diagram 300 relating SNR to modulation frequency for a system in which the exposure period is set to 1 ms and the frequency of a single-sinusoid modulation function is varied over a range of from zero to about 10 kHz.

FIG. 3A is a diagram 300 relating SNR to modulation frequency for a system in which the exposure period is set to 1 ms and the frequency of a single-sinusoid modulation function is varied over a range of from zero to about 10 kHz. At integer multiples of 1 kHz (corresponding to the reciprocal of the 1 ms exposure time), the SNR approaches zero because the exposure interval captures an integer number of cycles of the modulation. Demodulating a PSR provides a DC value of 50% of full intensity. At frequencies that are half-integer (M+0.5) multiples of 1 kHz, the 1 ms exposure time collects M full cycles of modulation (which cancel to DC) plus one half-cycle that remains to vary the brightness of the PSF row-by-row. As M increases, that one half-cycle that remains comprises about $1/(2*M+1)$ of the total modulation energy, explaining the 1/f envelope (curve 305). In this example the SNR exceeds 10 out past M=9.

Figure 3B:
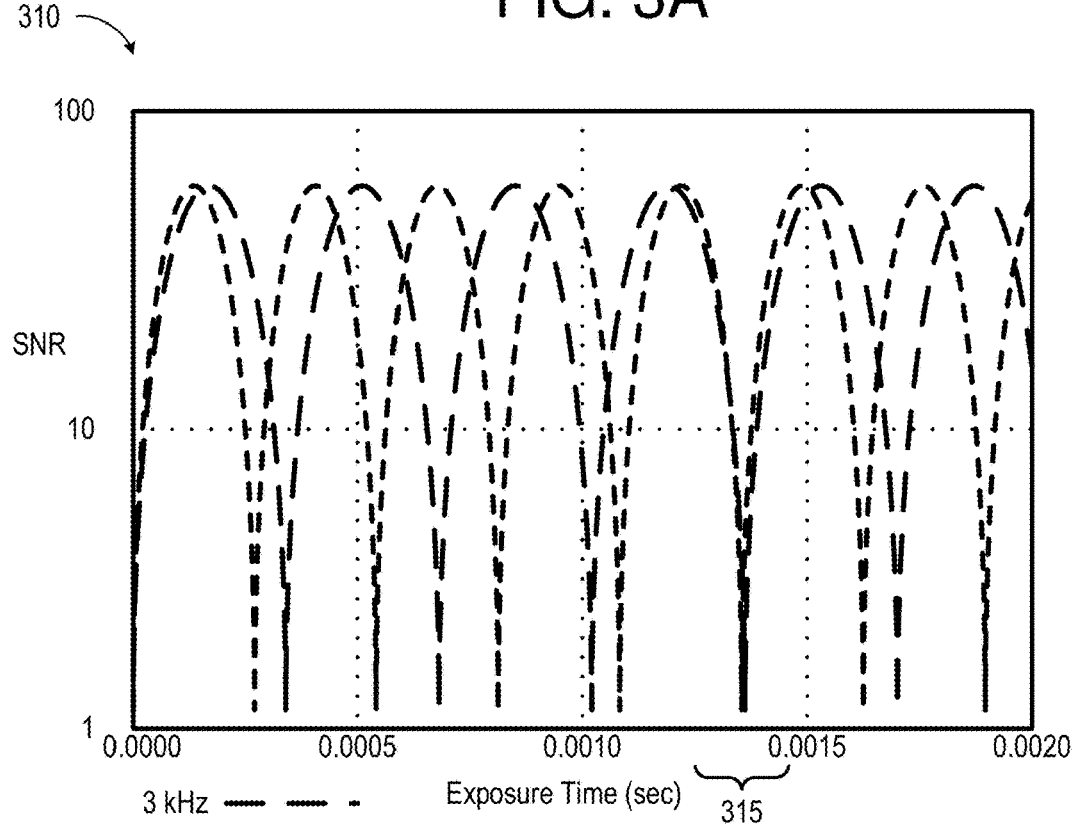
FIG. 3B is a diagram 310 illustrating SNR as a function of exposure time for a single point-source response (PSR) modulated using 3 kHz and 4.25 kHz sinusoids.

FIG. 3B is a diagram 310 illustrating SNR as a function of exposure time for a single PSR modulated using 3 kHz and 4.25 kHz sinusoids. Many exposure times effectively cancel one of the two PSRs, potentially sacrificing the ability to distinguish the point source responsible for the PSR from another. By modulating with the sum of the 3 kHz and 4.25 kHz sinusoids, only a single null 315 appears where both signals exhibit nulls. In some embodiments a coincident null occurs at the "temporal duration" of the PSR, defined here as the time of array 107 multiplied by the spatial height of the PSR in pixels. An imaging device or system may be programmed or otherwise configured to avoid exposure settings corresponding to multiples of the temporal duration.

Figure 4A:
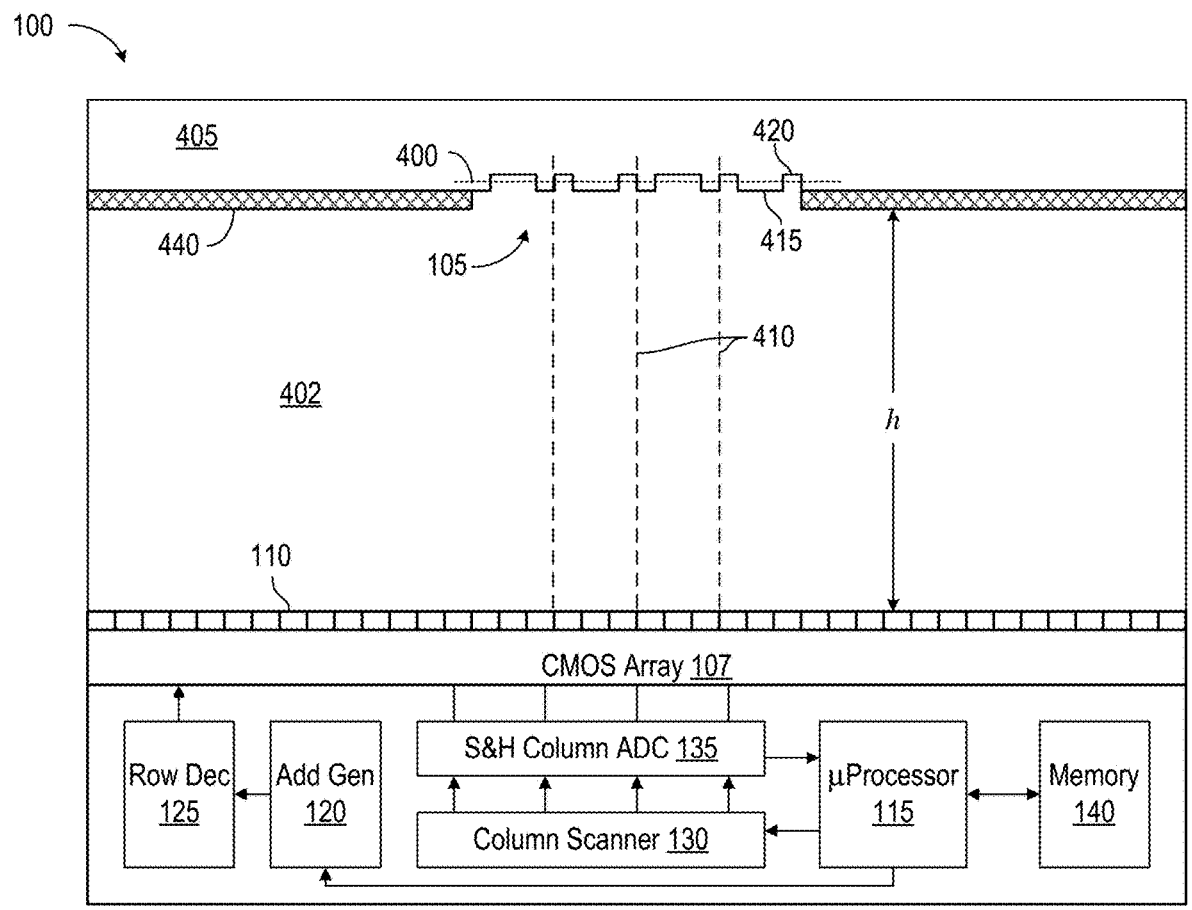

FIG. 4A is a cut-away view of an imaging image sensor 100 of FIG. 1A, like-identified elements being the same or similar. Grating 105 is a binary, phase-antisymmetric grating 105 overlying a CMOS (complementary metal-oxide-semiconductor) array 107 of pixels 110, and may additionally include a lenslet array that concentrates incident photons onto the most sensitive areas of pixels 110 to increase quantum efficiency. The features of grating 105 offer considerable insensitivity to the wavelength of incident light in a wavelength band of interest, and also to the manufactured distance h between grating 105 and photodetector array 107.

Grating 105 produces an interference pattern for capture by array 107. Image information, such as one or more PSRs, can then be extracted from the pattern. Light in a wavelength band of interest strikes grating 105 from a direction that is normal to the plane 400 of grating 105. Unless otherwise stated, the wavelength band of interest is the near-infrared spectrum. Image sensors developed for use in different applications can have different bands of interest, as is well understood by those of skill in the art.

Grating 105 is formed by an interface between light-transmissive media of different refractive indices, an optical Lanthanum dense flint glass layer 402 and polycarbonate plastic layer 405 above grating 105 in this example. Each of three boundaries of odd symmetry 410 is indicated using a vertical, dashed line. The higher features 420 of grating 105 induce phase retardations of half of one wavelength (π radians) relative to lower features 415. Features on either side of each boundary exhibit odd symmetry. With this arrangement, paired features induce respective phase delays that differ by approximately half a wavelength over the wavelength band of interest (e.g., near-infrared light). Due to dispersion, the difference in the refractive index of the Lanthanum dense flint glass layer 115 and the polycarbonate above grating 105 is an increasing function of wavelength, facilitating a wider wavelength band of interest over which the phase delay is approximately π radians. These elements produce an interference pattern for capture by array 107.

Image sensor 100 includes an optional opaque layer 440 patterned to include an aperture that encompasses or defines the effective limits of grating 105. The aperture windows captured interference patterns, which tends to reduce edge effects that result from subsequent image-recovery algorithms. The aperture can also improve angle sensitivity and spurious light rejection, which can be advantageous for e.g. motion detection and measurement. Opaque layer 440 can be applied directly to a layer forming grating 105, and may be coplanar or nearly coplanar with grating 105. Other embodiments omit the aperture, or may include an aperture spaced away from image sensor 100 instead of or in addition to the aperture in layer 440.

The example of FIG. 4A assumes light incident the light interface of image sensor 100 is normal to the plane of phase grating 105, in which case, by Huygens' principle, pairs of spherical wave re-radiators equidistant from one of the boundaries of odd symmetry 410 cancel each other out due to the half-wavelength phase delay of the radiator on one side of the boundary 125 compared to the other. Thus, light of any wavelength in the band of interest destructively interferes to produce curtains of minimum intensity that extend to array 107 beneath boundaries 410. Neither the depth nor the wavelength of light over a substantial spectrum significantly influences this destructive interference. Constructive interference similarly produces foci of maximum intensity that extend to array 107. Both the low and high features 415 and 420 admit light, which provides relatively high quantum efficiency relative to embodiments that selectively block light.

Figure 4B:
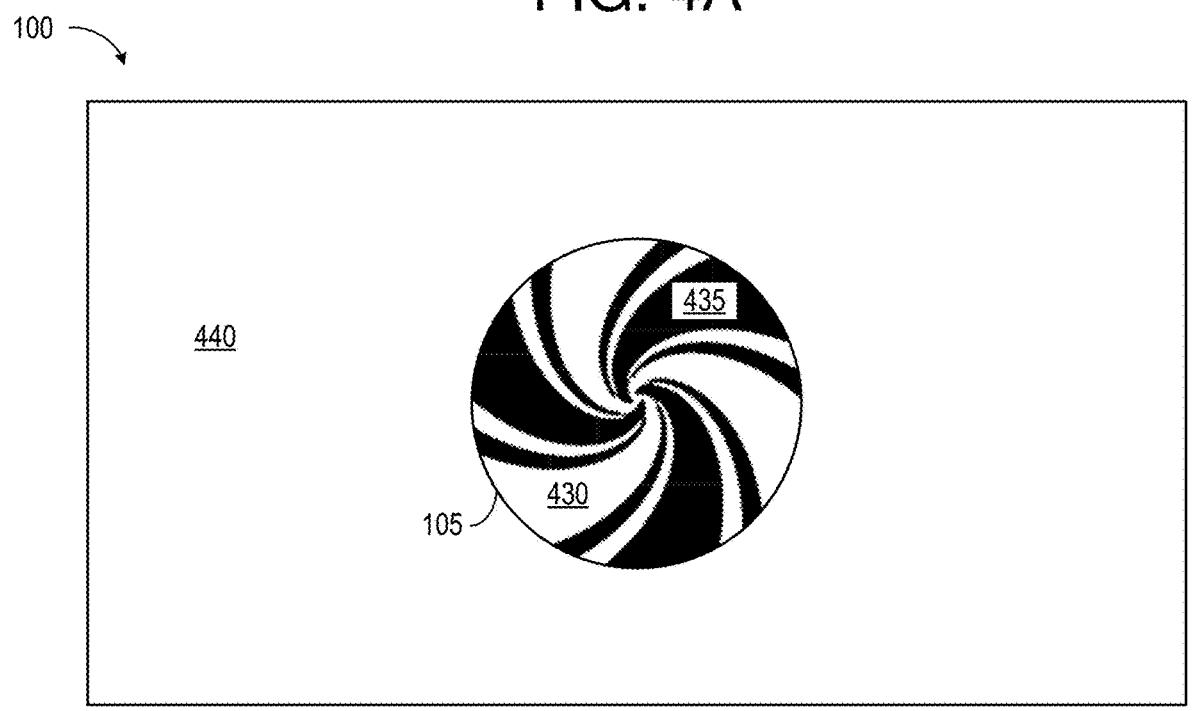
FIG. 4B is a plan view of imaging image sensor 100 of FIG. 1A in accordance with an embodiment in which grating 105 includes spiral features 430 and 435 to produce two-dimensional diffraction patterns.

FIG. 4B is a plan view of imaging image sensor 100 of FIG. 1A in accordance with an embodiment in which grating 105 includes spiral features 430 and 435 to produce two-dimensional diffraction patterns. Relatively narrow (wide) segment spacing works better for relatively high (low) frequencies, feature spacing increases along odd-symmetry boundaries (between elevated and recessed grating regions, represented by dark and light) with distance from the center. Curved boundaries of odd symmetry, defined between the elevated and recessed regions, extend radially from the center of the grating to the periphery, radiating out between the dark (elevated) and light (recessed) arms near the center. In some embodiments, the functional form of the curved boundaries approximates a logarithmic spiral. The area of grating 105 can be greater than that of the aperture in layer 440 to provide alignment tolerance in manufacturing.

Figure 5:
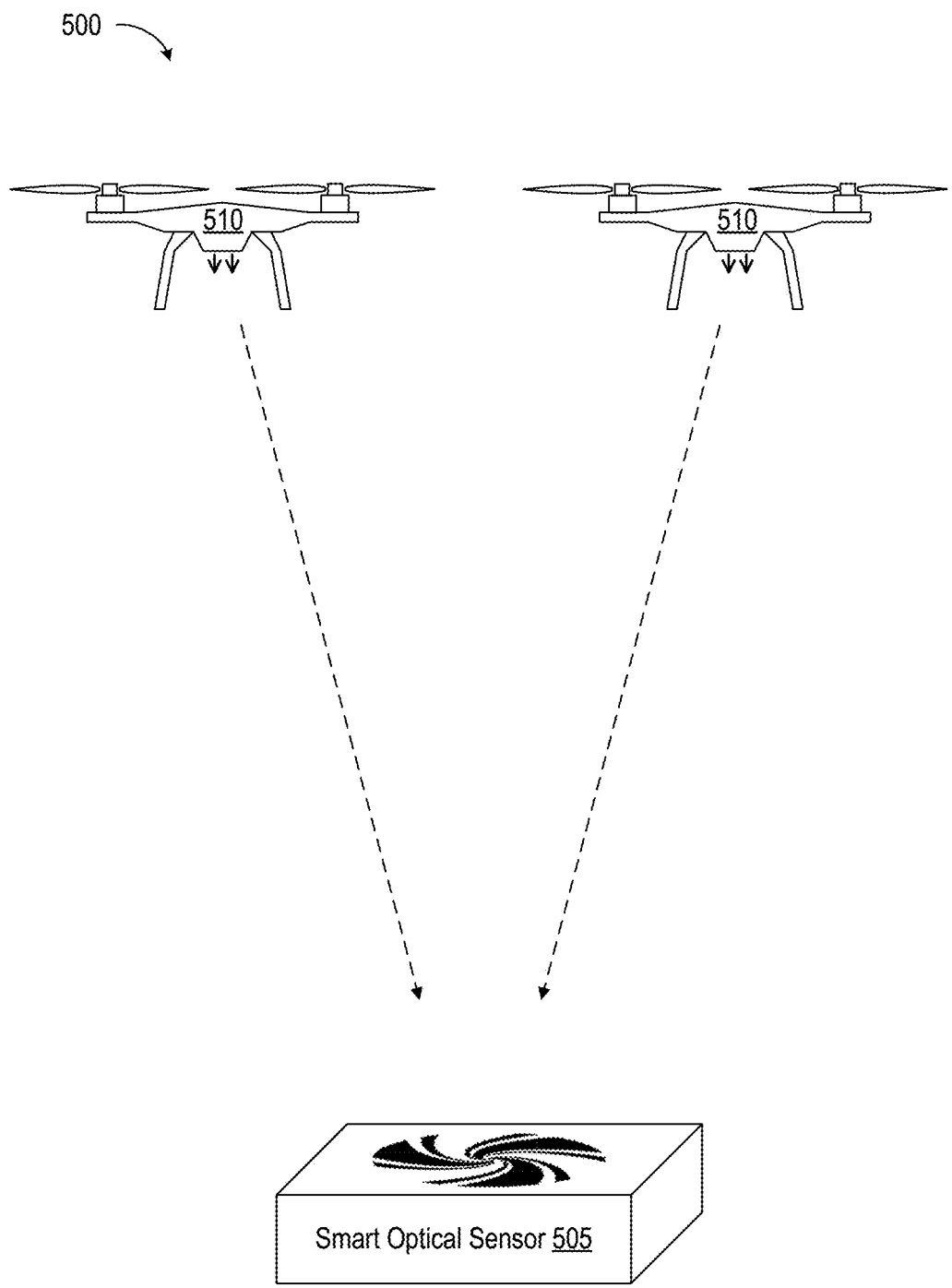
FIG. 5 illustrates a system 500 in which a smart image sensor 505 monitors the locations of some number of autonomous aerial vehicles (UAVs) 510 that emit from uniquely modulated illumination sources.

FIG. 5 illustrates a system 500 in which a smart image sensor 505 monitors the locations of some number of autonomous aerial vehicles (UAVs) 510 that emit from uniquely modulated illumination sources. Sensor 505 functions in the manner of sensor 103 of FIG. 1A to distinguish UAVs 510. Assuming a system where roughly sixty bits of information are available in the way a PSF is modulated, confusing one drone with another via a cryptographic "birthday attack" would start to be expected only where at least $2^{30}$ (more than a billion) drones are simultaneously present.

The depth of modulation seen at the pixel array depends on exposure time and modulation frequency. Longer exposures and higher frequencies generally decrease modulation depth and limit the bandwidth available to distinguish and communicate via point sources.

Returning to the example of FIG. 1A, image sensor 100 does not require a lens to produce images. Rather than focusing, as would be done by a traditional camera, image sensor 100 captures a diffraction pattern that bears little resemblance to an imaged scene, but that is nevertheless interpretable by a computer or processor. Grating 105 exhibits a PSF that produces a multi-armed spiral PSR on array 107 for every point of light in the imaged scene. The location of the center of a given PSR is uniquely determined by the incident angle of light from the corresponding point source. Since faraway scenes can be thought of as collections of point sources of varying intensity, the sensed PSRs resemble a convolution of the PSF with the faraway scene. Embodiments of phase grating 105 and related elements are detailed in U.S. Patent Publication 2016/0241799 to Patrick R. Gill, which is incorporated herein in its entirety.

Imaging systems of the type detailed herein have many uses. In a toll-payment application, for example, a vehicle or driver could arrange to have a toll payment made at a certain geographic location. Part of a secure transaction could be the agreement on roughly 60 digits of a one-time-use code. When approaching the toll location, the vehicle could then flash either a specific light of a specific wavelength or perhaps its headlights or other exiting light with a modulation that encodes the shared secret one-time-use code. The toll imaging hardware then knows that this specific vehicle has paid their toll, and can track the cleared vehicle visually. Other nearby cars not displaying an authentic code could be directed aside for secondary payment. This technology could be much faster than existing RF transactions, which require vehicles to slow down in part so the much longer-wavelength RF communications are sure to localize the correct cars to ensure the correct vehicles are permitted through the toll booth.

Bus headlights could encode their route numbers or other identifiers, allowing wearables to direct a user on the right routes with minimal attention. Other in-building and in-city navigation could be facilitated by LED beacons broadcasting information about their location.

Indoor supplements to GPS signaling could also be implemented. An 80-bit signal is sufficient to specify 31 bits of latitude and longitude plus 18 bits of altitude: specificity to within about an inch. (Finer precisions are made moot in a matter of years due to continental drift.) Wearables navigating by these beacons could allow location services on a much finer scale than GPS, without any satellite receiver needed.

Authentication codes with spatial specificity can also be useful in e-commerce. For example, suppose a consumer pays for a physical object or service in a situation where several nearby consumers also want the same thing. If they have a device capable of modulating a one-time-use confirmation authenticating them as having payed, then selling hardware can pinpoint their location and deliver the goods or services automatically to the right location. If near-field communication (NFC) is more cumbersome than a user in a checkout line would desire, and the user trusts that no hackers have put malicious LEDs into the ceiling of a store, then the user can use their smartphone to confirm a certain low-bandwidth signal is authentic to the store. The low-bandwidth signal could be the equivalent of a URL specifying an https website or some other identifier of a form of initiating a digital transaction with the rightful owner of the space, using standard public key cryptography. The combination of the consumer smart image sensor and their accelerometer can distinguish the signal on the ceiling from any other nearby false light sources, reducing the risk of a spoofing attack and providing a spatially vetted authentication signal beyond what is present in NFC payment.

A smart optical sensor of the type detailed herein may be mounted with a coaxial focusing camera, and the user could be presented with a real-time video view of the scene with icon overlays on the detected point sources. Tapping the desired one could trigger any of a number of actions, for example ordering at a sushi restaurant. Each display item has a beacon, and the customer points their phone at the display and taps on the ones they want. The beacons can also identify where the customer is in the store, allowing for example accurate delivery of sushi to the correct table.

Tracking authenticated humans can also be made easier by having each human tagged with a specific transponder code flashing either a fixed pattern or some form of encrypted signal. For example, once a secure connection between the user's badge and a base station is first made (possibly over RF), the two parties can securely agree on a session key that is then hashed with the current time each second, and a few digits of this hash is flashed to the observing hardware every second. The user is then authenticated and their badge's position is monitored continuously. Many users can be located to within a few arcminutes using only one small image sensor.

This scheme of hashed continuously changing modulation could be used in other scenarios as well, in place of the one-time-use codes. Other similar cryptographic methods for generating streamed symmetric cyphers are also great alternatives to the method described above where a hash of the current time plus a shared secret determines the ciphertext of the transponder.

A smart optical sensor can support low-latency vehicle-to-vehicle (or vehicle-to-city) communication by e.g. modulating existing vehicle lights or through dedicated wavelengths. The payload of a few bytes could serve merely as a transponder, tagging the visible locations of cars with respect to each other, or could itself contain messages regarding planned course corrections, upcoming hazards, etc.

Error correction codes or checksums may be used to increase the probability of a correct transmission in any of the above scenarios. Where the message to be sent is slightly longer than the bandwidth of a single frame, the message can be partitioned over a few frames of data. Synchrony between sender and receiver can help improve bandwidth and integrity, although often it will not be necessary or easy to implement.

Angular velocity of a point source may also be estimated by geometric distortion of the PSR captured from the pixel array. As rows are exposed in sequence, from top to bottom, horizontal motion of a point source will result in the captured PSF being stretched diagonally, a distortion known as "shear." If the undistorted PSR fits neatly within a square, the distorted PSR will be fit best by a parallelogram whose left and right sides are not vertical and whose top and bottom edges are horizontally displaced relative to each other. This distortion is straightforward to estimate. Likewise, vertical motion of the point source will be apparent as a magnification of the PSR in the vertical direction. As in the horizontal case, this magnification is due to the PSR being in different positions during the exposure times of different rows. The row capturing the top edge of the PSR sees the PSR in a position different from that seen by the row that captures the bottom edge of the PSR. Vertical motion may make a nominally 60-pixel tall PSF appear to be 55 or 65 pixels tall, according to its vertical velocity.

While the subject matter has been described in connection with specific embodiments, other embodiments are also envisioned. For example, the wavelength band of interest can be broader or narrower than those of the foregoing examples, and may be discontinuous. Disambiguation and three-dimensional resolution can be enhanced by imaging point sources from multiple angles using multiple smart optical sensors of the typed detailed herein. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An optical system to sense incident light, the optical system comprising:
    an optic exhibiting a point-spread function, the optic to produce a point-spread response responsive to the incident light;
    rows of pixels, each pixel to sample a respective region of the point-spread response, each of the rows of pixels producing a row of sample values, the rows of sample values providing an image frame; and
    at least one processor to:
        read the rows of sample values within the image frame; and
        use a difference in relative intensity between the successively read rows of sample values within the image frame to identify modulation information.

2. The optical system of claim 1, wherein the incident light comprises point sources, the at least one processor to distinguish the point sources responsive to the modulation information.

3. The optical system of claim 1, further comprising memory to store a kernel representative of the point-spread function of the optic.

4. The optical system of claim 3, the at least one processor to detect a point-spread function from the rows of sample values and align the point-spread function with the kernel before comparing each of the rows of sample values with a corresponding slice of the kernel.

5. The optical system of claim 3, wherein demodulating the intensity values comprises comparing each of the rows of sample values to a corresponding slice of the kernel.

6. The optical system of claim 3, the memory to store a modulation signature, the at least one processor to compare the modulation information to the modulation signature.

7. The optical system of claim 6, the memory to store a second modulation signature, each of the first-mentioned and second modulation signatures corresponding to a respective one of a first illumination source and a second illumination source, the at least one processor to distinguish between the first illumination source and the second illumination source using the modulation information.

8. The optical system of claim 1, further comprising a modulated illumination source to produce at least a portion of the incident light.

9. The optical system of claim 8, the modulated illumination source exhibiting a modulation period.

10. The optical system of claim 9, the at least one processor to read each successive row a row time less than the modulation period after a prior row, and to read all of the rows of sample values over a frame time greater than the modulation period.

11. The optical system of claim 9, further comprising a second modulated illumination source exhibiting a second modulation period different from the first-mentioned modulation period.

12. The optical system of claim 11, the at least one processor to read each successive row a row time less than the first-mentioned modulation period and the second modulation period after a prior row, and to read all of the rows of sample values over a frame time greater than the first-mentioned modulation period and the second modulation period.

13. The optical system of claim 1, the point-spread response illuminating R of the pixels and defining a convex hull over S of the pixels, wherein S>2R.

14. A method for identifying a modulated point source, the method comprising:

exposing rows of pixels to a pattern from the modulated point source;

sampling the pattern using the rows of pixels;

locating a point-spread response in the sampled pattern, the sampled pattern having a row of sample values for each of the rows of pixels;

accumulating an intensity value for each of the rows of sample values; and demodulating the accumulated intensity values.

15. The method of claim 14, further comprising cropping the point-spread response before accumulating the intensity values.

16. The method of claim 14, wherein locating a point-spread response in the sampled pattern comprises correlating the sampled pattern with a kernel representative of the point-spread response.

17. The method of claim 16, further comprising storing the kernel.

18. The method of claim 14, further comprising forming the pattern from light emanating from a scene through a phase grating.

19. The method of claim 14, further comprising successively sampling the rows of pixels.

20. The method of claim 19, wherein the modulated point source exhibits a modulation period, and wherein each successive row is sampled a row time less than the modulation period after a prior row.

21. The method of claim 20, wherein all of the rows are sampled over a frame time greater than the modulation period.

22. An optical system to sense incident light, the optical system comprising:

an optical grating exhibiting a point-spread function, the optical grating to produce a diffractive response to the incident light;

rows of pixels, each pixel to sample a respective region of the diffractive response, each of the rows of pixels producing a row of sample values; and means for a processor to use a difference in relative intensity between successively read rows of sample values within a frame to identify modulation information.

* * * * *